United States Patent [19]

Silkman

[11] Patent Number: 4,553,027

[45] Date of Patent: Nov. 12, 1985

[54] APPARATUS FOR READING ENCODED INFORMATION ON A CARRIER SUBJECT TO NON-UNIFORM MOTION

[75] Inventor: Ronald W. Silkman, Pittsford, N.Y.

[73] Assignee: Eastman Kodak Company, Rochester, N.Y.

[21] Appl. No.: 657,312

[22] Filed: Oct. 3, 1984

[51] Int. Cl.[4] ............................................. G06K 7/016
[52] U.S. Cl. ................................................... 235/474
[58] Field of Search ........................................ 235/474

[56]  References Cited

U.S. PATENT DOCUMENTS

| | | | |
|---|---|---|---|
| 3,549,867 | 12/1970 | Malone | 235/61.11 |
| 3,562,494 | 2/1971 | Schmidt | 235/61.11 |
| 3,636,313 | 1/1972 | Markowitz et al. | 235/61.11 D |
| 3,660,746 | 5/1972 | Milek | 318/696 |
| 3,745,354 | 7/1973 | Vargo | 250/219 D |
| 3,752,963 | 8/1973 | Herrin | 235/61.11 E |
| 3,761,684 | 9/1973 | Schrader | 235/61.11 R |
| 3,763,351 | 10/1973 | Deerhake | 235/61.11 E |
| 3,792,236 | 2/1974 | Dobras et al. | 235/61.11 E |
| 3,849,631 | 11/1974 | Merlino, Jr. et al. | 235/611.1 B |
| 3,864,548 | 2/1975 | O'Neil, Jr. et al. | 235/61.11 E |
| 3,987,278 | 10/1976 | Van Elzakker et al. | 235/61.11 E |
| 4,032,982 | 6/1977 | Arter et al. | 360/74 |
| 4,034,277 | 7/1977 | Leenhouts | 318/685 |
| 4,082,943 | 4/1978 | Jensen et al. | 235/303.1 |
| 4,103,216 | 7/1978 | Hayes | 318/685 |
| 4,114,031 | 9/1978 | Bushman | 235/474 |
| 4,176,783 | 12/1979 | Eppich | 235/474 |
| 4,203,678 | 5/1980 | Nordstrom et al. | 400/320 |

Primary Examiner—Harold I. Pitts
Attorney, Agent, or Firm—Dennis R. Arndt

[57] ABSTRACT

An apparatus for reading machine-readable information from a record element, which has a forward direction filter that generates location clock pulses only when the record element is moving in the absolute forward direction. The utilization of these pulses to control the sampling of information prevents the mis-reading of information caused by velocity variations or reciprocative motion of the record element.

4 Claims, 6 Drawing Figures

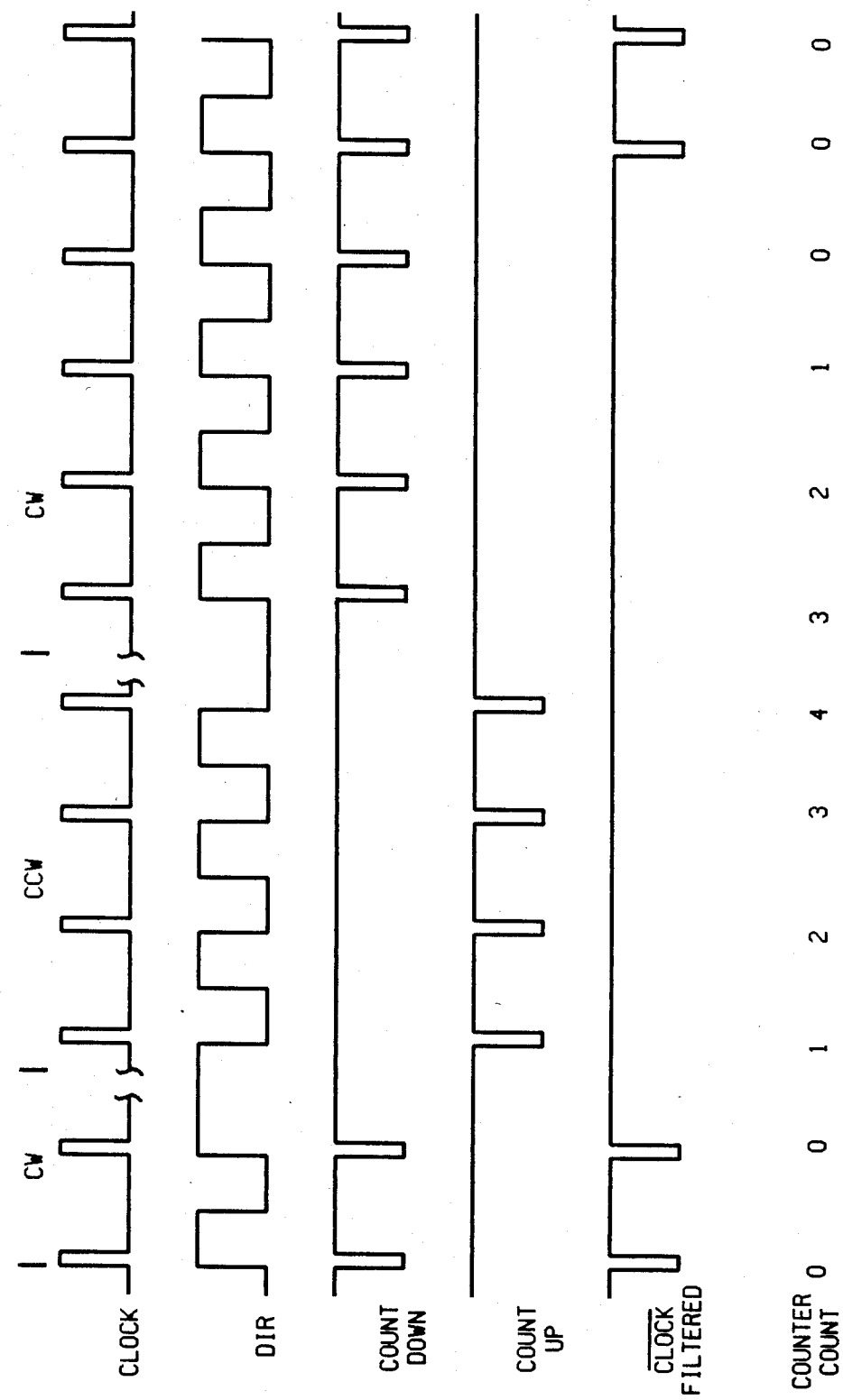

APPARATUS FOR READING ENCODED INFORMATION ON A CARRIER SUBJECT TO NON-UNIFORM MOTION

BACKGROUND OF THE INVENTION

1. Field of the Invention

The present invention relates generally to apparatus for reading binary coded information from a record element upon which such information has been encoded either by direct printing or in the form of a label affixed to the record element. More particularly, the invention relates to avoiding erroneous output signals when reading such information from a moving record element that is subject to reciprocative movement as it is advanced past a sensor.

2. Description of the Prior Art

Bar coding is a well-known technique for recording digital information by means of a module of parallel wide and narrow bars or spaces. In module-width encoding, data with a logic value of "0" is printed as a narrow element, and logic "1's" are printed as wide elements, typically two to three times the narrow element's width. This sequence of digits forms a binary word that corresponds to a character defined by the bar code used. Depending on the code, binary data may be represented by both bars and spaces or by bars only.

To read the number encoded by the array, the record element on which the array is carried can be moved at a uniform known velocity past an optical sensor which provides a positive signal at each transition between the trailing edge of a space and the leading edge of a bar and a negative signal at each transition between the trailing edge of a bar and the leading edge of a space. By timing the interval between successive positive and negative signals, the wide and narrow bars can be identified and the coded number can be decoded. Also, the decoder can be designed to identify as spurious those signals that are not related in a time frame corresponding to the bar code. For example, a positive and negative signal occur within a much shorter interval then would correspond to a narrow bar, these signals are assumed to be caused by a noise spike or other anomaly and are rejected.

In many applications, it is not practical to advance a bar code array past the sensor continuously and at a known constant velocity. For example, many applications require the record bearing element to be advanced intermittently for reasons unrelated to reading the bar code. Often this requirement is best met by using a stepper motor to advance the record element, which potentially gives rise to two sources of erroneous decoding.

First, when a stepper motor is energized, its shaft rotates to the new position as fast as the magnetic field can effectively overcome the frictional and inertial load of the system. This varies from step to step, from load to load and as a function of the angular increment of rotation. If the motor steps, translated to movement of the record element, are significantly greater than the width of a narrow code bar, it is possible that the narrow bar will be traversed during the maximum velocity of the record element. The resulting transition pulses will then occur so rapidly that the decoding circuitry may interpret those pulses as an extraneous noise spike that is to be disregarded. Conversely, if a narrow bar transition occurs just after the motor energization, i.e. during the initial relatively slow movement of the record element, the time delay before the occurrence of the trailing edge bar transition may cause that narrow bar to be erroneously interpreted as a wide bar.

Secondly, each time the stepper motor is actuated it tends to overshoot slightly its desired terminal position and then to oscillate about that position before it comes to rest. If this reverse movement is significant in relation to the width of a coding bar, the corresponding reverse movement of the record element can cause the same transition to be sensed more than once by the sensor thus resulting in another form of coding error. This phenomenon is further exasperated by the fact that the oscillation of the record element may cause it to momentarily buckle because of its inability to accelerate instantaneously, thus causing another source of multiple transitions at the sensor.

One means for reducing the decoding errors attributable to varying velocities of the record element, is to provide the bar code with a separate timing track which is sensed by a second sensor to identify the regions or cells of the bar code array in which each wide or narrow bar will occur. This insures that only one positive and negative pulse will be sensed within each coding cell and the interval between the corresponding transitions can be timed by reference to the width of the cell to distinguish wide and narrow bars. Alternatively, the cells can be identified by positively driving the record element, e.g. by means of sprocket holes along the edge thereof, so that the particular cell in scanning position is positively related to the angular position of the stepper motor. While such arrangements tend to reduce the velocity variation problems, they do not, per se, overcome the problem of reciprocative movement of the record bearing element. U.S. Pat. No. 3,761,684 addresses this problem by means of a circuit that processes the sprocket control signals in an apparatus in which the record bearing element is advanced one code bar at a time by a stepper motor. The signal processor is designed to allow only one set of positive and negative signal transitions for each advance command of the stepping motor, thereby preventing the recognition of erroneous signals. Presumably, a similar arrangement could be employed deriving its signal from a timing track, but, in either event, secondary means such as the timing track or sprocket holes must be provided in accurate relation to the bar code. In many cases such secondary means are undesirable or totally impractical, particularly when the bar code is made as small as possible, thus dictating correspondingly narrow cells. Also, while such an approach eliminates normally encountered errors due to multiple transition scanning, it doesn't completely address the velocity error problem because the characteristics of a stepper motor cause the velocity of the record bearing element to vary during each cell to cell movement as previously described.

SUMMARY OF THE INVENTION

The preferred embodiment of the invention eliminates the need for sophisticated stepper motors and control devices and also any need for a supplemental timing track or the like. Even though the record bearing element is advanced in relatively large increments and the movement of the record element may be monitored via signals generated by a quadrature encoder that provides the timing pulses indicative of the very small movement increments required to distinguish bar widths as just described above. Additionally, the quadrature encoder is capable of distinguishing between forward and backward movement of the record element. The decoder circuitry includes a direction filter that identifies the pulses generated by rearward movement of the record element and corrects the pulse count so that it reflects only absolute forward movement, thereby allowing signals caused by multiple transition readings to be disregarded.

DESCRIPTION OF THE DRAWINGS

In a detailed description of a preferred embodiment of the invention presented below, reference is made to the accompanying drawing, in which:

FIG. 5 illustrates various waveforms associated with the operation of the forward direction filter circuitry.

DETAILED DESCRIPTION OF THE PREFERRED EMBODIMENT

Figure 1:
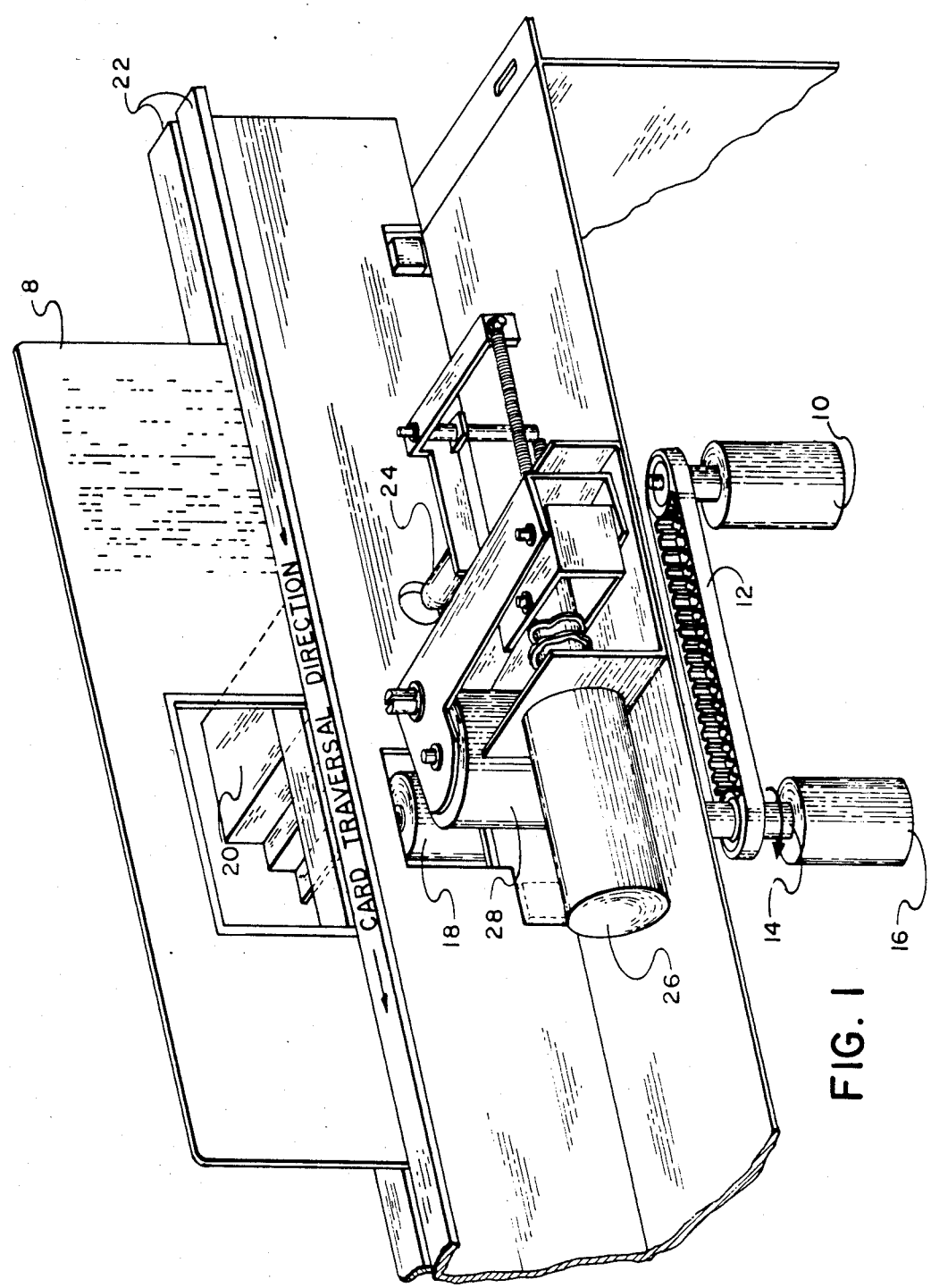
FIG. 1 is the reader portion of the apparatus for reading encoded information from a carrier.

Referring to FIG. 1 of the drawings, an apparatus for reading machine-readable information from a record element 8 is shown as having a stepper motor 10 and belt 12 to drive a drive shaft 14. A quadrature encoder 16 is connected to one end of the drive shaft 14 and an idler roller 18 is connected to the opposite end of the drive shaft. Such a quadrature encoder may be obtained from the Hewlett Packard Corporation as the HEDS 5000/6000 encoders, which translate the rotational movement of a shaft into an electrical waveform. The stepper motor 10 is controlled by a microprocessor (not shown) that also controls the operation of solenoid 26. When solenoid 26 is activated by the microprocessor, pinch bar 24 presses the encoded record element 8 against one side of the card guide 22 to provide proper registration of the element 8 in the guide. The activation of solenoid 26 also moves the drive roller 28 against the record element 8 pressing the record element between the drive roller 28 and the rotating idler roller 18, which causes the record element 8 to be driven along the card guide 22. A bar code reader 20 reads the encoded information from the record element 8 as it passes an aperture that is provided in card guide 22.

In such an apparatus, it would be desirable to utilize a stepper motor operating at a high enough speed to simulate a constant velocity traversal of the record element 8. However, to run a stepper motor fast enough to simulate a constant velocity a dedicated microprocessor would be needed to control the stepping function. The motor would also be required to have a high degree of resolution to obtain the desired results. Such high resolution stepping motors are expensive and a dedicated microprocessor would add additional expense to the system. Therefore, the motor chosen for stepper motor 10 is a low cost motor that rotates 7.5° per step or 48 steps per revolution. The use of a low resolution stepping motor eliminates the need for a dedicated microprocessor. The oscillation problem associated with stepping motors, however, is enhanced due to the relatively large step size.

In the apparatus shown in FIG. 1, one step of the motor 10 translates to a 0.050″ linear displacement of the record element 8. The bar code used on the record element has a narrow bar that is 0.007″ in length. A 30% reverse oscillation in the drive mechanism would result in multiple transitions in the output signal of the bar code reader 20 and would result in decoding errors. The problem of velocity variation and reciprocative motion of the record element is overcome in the preferred embodiment of the invention by the use of a quandrature encoder and special filtering circuitry.

The quadrature encoder 16 generates two output signals, channel A (CHA) and channel B (CHB), that are directly proportional to the linear displacement of the record element 8. One of the output signals always lags or leads the other by 90° depending on the direction of rotation of the shaft 14. The quadrature encoder 16 produces 1024 output pulses per revolution giving it the ability to detect a 0.0024″ reverse displacement in the drive mechanism. The encoder 16 should be placed as close as possible to the read station to reduce the possibility of any mechanical dampening effects from the idler roller 18 and drive shaft 14.

Figure 2:
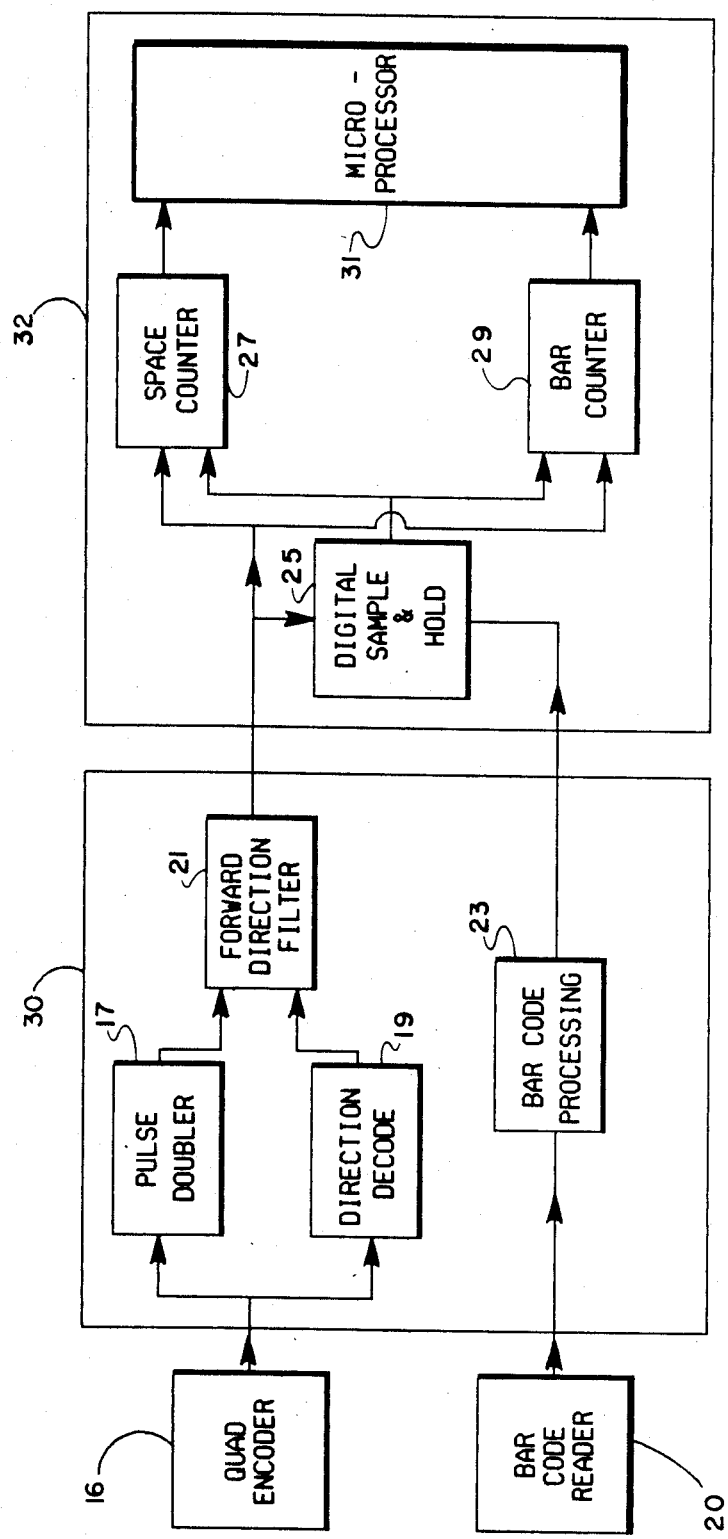
FIG. 2 is a block diagram of the control system for an apparatus that reads encoded information from a carrier and embodying the present invention.

The signals from the quadrature encoder 16 and bar code reader 20 are processed by a filter circuit 30, the components thereof are shown in FIG. 2. A pulse doubler 17 doubles the number of pulses from the encoder 16, thereby improving the ability to detect the linear displacement of the record element 8 to 0.0012″. A direction decode circuit 19 uses the 90° phase difference in the output signal of the encoder 16 to generate a direction signal (DIR) that indicates the clock-wise (CW) or counter-clock-wise (CCW) rotation of the shaft 14 and therefore the forward or reverse motion of the recording element 8 (CW rotation of the shaft 14 is indicated by the arrow in FIG. 1). A forward direction filter 21 uses the output from the pulse doubler 17 and direction decode circuit 19 to generate a signal the periodicity of which corresponds to the displacement of record element 8 in the forward direction, and another signal the periodicity of which corresponds to the displacement of record element 8 in the reverse direction. These signals are used to produce a third signal the periodicity of which represents the absolute displacement of the recording element in the forward direction. Therefore, when the record element oscillates due to the stepper motor drive, the forward direction filter 21 will only output a signal when the element reaches the position where it commenced reverse motion and will continue to output a signal as long as forward motion is maintained. Filter circuit 30 also provides a bar code processing circuit 23 to transform the output signal from the bar code reader 20 to a square wave signal Bar Code (the presence of a bar above the name of a particular signal indicates the inversion of the named signal without the bar) that can control digital logic circuits. The output of the forward direction filter 21 is used to clock the sample and hold circuit 25 in decode circuit 32 (FIG. 2) which samples the bar code processing circuit 23 output. The forward direction filter 21 output also clocks space counter 27 and bar counter 29 in decode circuit 32 that are sensitive to the rising and falling edges of the output from the bar code processor. At initialization the microprocessor 31 sets the counters to zero. As a high/low transition is received from the sample and hold circuit 25, the bar counter 29 begins to count the duration of the bar. When a low/high transition is received, the space counter 27 counts the duration of the space. While the space counter 27 is activated, the microprocessor reads the data from the bar counter and resets the counter to zero to initialize it for the next bar.

Figure 3:
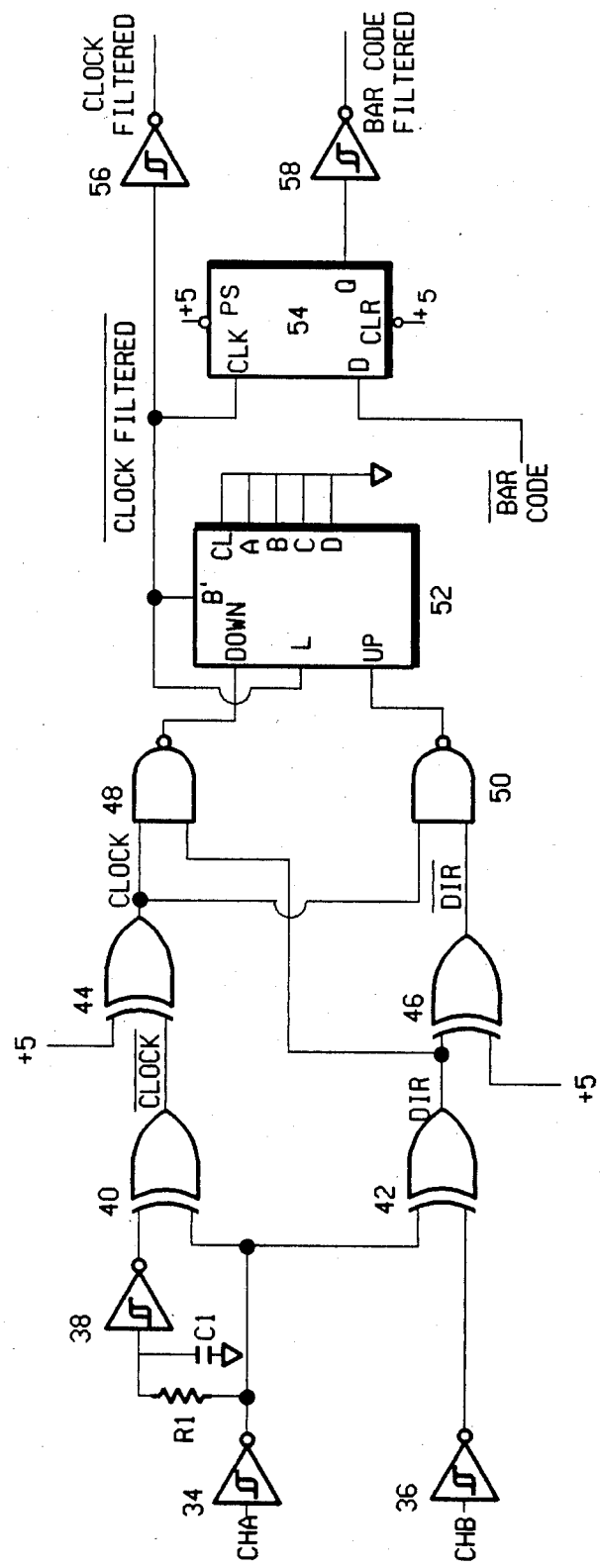
FIG. 3 is a schematic illustration of the electrical circuitry used in the control system.
Figure 4A:
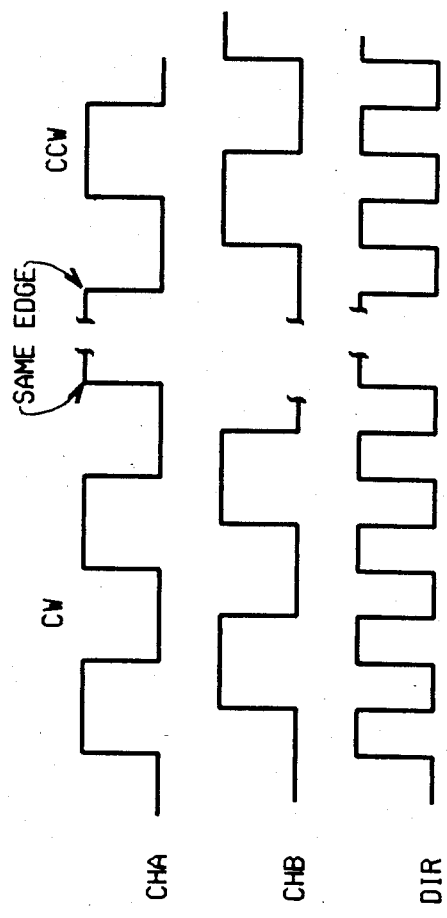
FIGS. 4a and 4b inclusive are waveforms illustrating various electronic signals associated with the pulse doubler and direction decode circuitry.

The operation of filter circuit 30 will be described in further detail with reference to FIG. 3. The signals from the encoder 16 have relatively slow rise and fall times which must be made faster to control digital logic circuits. Schmidt triggers 34 and 36 are used to enhance the leading and trailing edges of the input signals CHA and CHB. The Schmidt triggers also invert the CHA and CHB signals to form $\overline{CHA}$ and $\overline{CHB}$. The phase difference in $\overline{CHA}$ and $\overline{CHB}$ is used to generate the direction signal (DIR) by passing $\overline{CHA}$ and $\overline{CHB}$ through exclusive OR gate 42 (FIG. 4A shows the phase relationship between the CHA, CHB and DIR signals).

Figure 4B:
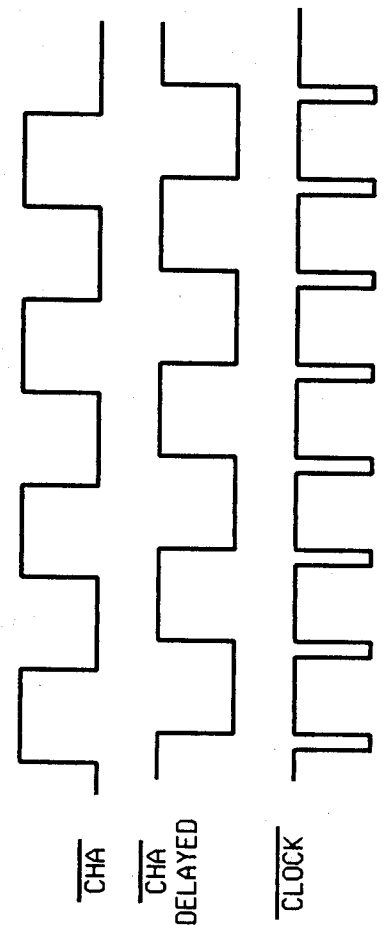

The $\overline{CHA}$ signal is also passed through the pulse doubler circuit 17 composed of resistor R1, capacitor C1 and exclusive OR gate 40. R1 and C1 create a small delay in supplying the $\overline{CHA}$ signal to one input of the exclusive OR gate 40. The gate 40 senses the delay time between $\overline{CHA}$ and the delayed $\overline{CHA}$ signals and produces an inverted clock signal ($\overline{clock}$) that is double the input frequency of $\overline{CHA}$ as shown in FIG. 4B.

The forward direction filter 21 is comprised of exclusive OR gates 44 and 46 (FIG. 3) that are used as inverters, NAND gates 48 and 50 and counter 52. The clock signal output from inverter 44 is supplied to both NAND gates. The DIR signal output from gate 42 is supplied to the other input of NAND gate 48 and the $\overline{DIR}$ signal is supplied to the other input of NAND gate 50. The resultant output of the NAND gates is a count down signal when the shaft is moving CW and a count up signal when the shaft is moving CCW (CW rotation corresponds to forward displacement of record element 8).

The counter 52 is used to generate a an inverted clock filtered signal i.e. clock filtered that is directly proportional to the absolute linear displacement of the record element 8 in the forward direction. In the preferred embodiment of the invention, counter 52 is a 74LS193 binary counter. The clock filtered output signal is generated at the borrow output (B') of the 74LS193 counter. The internal logic of counter 52 is such that if the count is zero and the clock down input goes to a low state, the B' output will also go low. The B' output is generally used to signal other cascaded counters that the counter will wrap around on the next rising edge presented at the clock down input. In this application, the counter is prevented from wrapping around from zero state by wiring the B' output to the load input L.

The L input's function is to load the counter with a set count that is present on the data input pins A, B, C, and D. In this configuration, the four inputs load a zero back into the counter. Therefore, when the counter is at the zero count a clock pulse present at the clock down input will load the counter with a zero freezing the counter at the zero count.

As can be seen in FIG. 5, as long as the counter count is at zero and the shaft is rotating CW, count down pulses will be supplied to the down input of the counter 52 which will cause the clock filtered signal to be generated at output B'. When the shaft rotates in the CCW direction due to oscillations in the stepper motor 10, clock filtered pulses are not generated as the counter begins to count up. When the shaft moves in the forward direction again, the clock filtered pulses do not appear at output B' of the counter 52 until the counter has been counted down to zero. The clock filtered signal is then used by the decode circuit 32 (FIG. 2) to clock the sample and hold flip-flop 54, so that Bar Code signal supplied by the bar code processor 23 will not be sampled unless the record element is moving in the forward direction.

The multiple transitions in the output signal of the bar code reader, caused by the non-uniform motion of the record element, would prohibit proper decoding of the information on record element 8 without the use of the filter circuit 30. Although the invention has been described in detail with particular reference to certain preferred embodiments thereof, it will be understood that variations and modifications can be effected within the spirit and scope of the invention.

What is claimed is:

1. Oscillation compensating means for an apparatus for reading machine-readable information encoded on a record element transported by a transport mechanism that subjects the coded record element to oscillations as it is transported, said apparatus comprising:
    guide path defining means for defining a guide path for the record element;
    motive means for moving the record element along the guide path;
    sensor means for sensing the information encoded on the record element and producing a signal corresponding thereto as the record element is moved along the guide path past the sensor means;
    detector means for detecting the forward and reverse motion of said record element and for providing corresponding output signals;
    signal means responsive to the output signals of said detector means for generating a signal that is directly proportional to the absolute forward motion of the record element; and
    processor means responsive to the information signal derived from the sensor means and said signal means for accurately decoding the information read from said record element.

2. The invention claimed in claim 1 wherein said detector means is a quadrature encoder.

3. Oscillation compensating means for an apparatus for reading machine-readable information encoded on a record element transported by a transport mechanism that subjects the coded record element to oscillations as it is transported, said apparatus comprising:
    guide path defining means for defining a guide path for the record element;
    motive means for moving the record element along the guide path;
    sensor means for sensing the information encoded on the record element and producing a signal corresponding thereto as the record element is moved along the guide path past the sensor means;
    first signal means for generating a first signal the periodicity of which is directly proportional to the distance that the record element has moved in a first direction;
    second signal means for generating a second signal the periodicity of which is directly proportional to the distance that the record element has moved in a second direction;
    third signal means responsive to said first and second signals for generating a third signal the periodicity of which is directly proportional to the absolute distance that the record element has moved in said first direction; and processor means responsive to the information signal derived from the sensor means and said third signal means for accurately decoding the information read from said record element.

4. Oscillation compensating means for an apparatus for reading machine-readable information encoded on a record element transported by a transport mechanism that subjects the coded record element to oscillations as it is transported, said apparatus comprising:

guide path defining means for defining a guide path for the record element;

motive means for moving the record element along the guide path;

sensor means for sensing the information encoded on the record element and producing a signal corresponding thereto as the record element is moved along the guide path past the sensor means;

first signal means for generating a series of pulses indicative of the record element moving in a first direction;

second signal means for generating a second series of pulses indicative of the record element moving in a second direction;

third signal means responsive to said first and second signal means for generating a series of pulses only when the record element is moving in the forward direction; and processor means responsive to the information signal derived from the sensor means and said third signal means for accurately decoding the information read from said record element.

* * * * *